United States Patent [19]
Baert et al.

[11] Patent Number: 6,003,316
[45] Date of Patent: Dec. 21, 1999

[54] EXHAUST-GAS RECIRCULATION SYSTEM FOR A TURBOCHARGED INTERNAL COMBUSTION ENGINE

[75] Inventors: Rik Silveer Geert Baert, Wommelgem, Belgium; Derek Edward Beckman, Rotterdam, Netherlands; Hendrik Jan Dekker, Rijswijk, Netherlands; Willem Lein Sturm, Delft, Netherlands; Rudolfus Petrus Verbeek, Naaldwijk, Netherlands

[73] Assignee: Nederlandse Organisatie voor Toegepast-Natuurwetenschappelijk Onderzoek TNO, Delft, Netherlands

[21] Appl. No.: 08/930,992

[22] PCT Filed: Apr. 11, 1996

[86] PCT No.: PCT/NL96/00159

§ 371 Date: Nov. 18, 1997

§ 102(e) Date: Nov. 18, 1997

[87] PCT Pub. No.: WO96/32583

PCT Pub. Date: Oct. 17, 1996

[30] Foreign Application Priority Data

Apr. 11, 1995 [NL] Netherlands ............... 1000119

[51] Int. Cl.⁶ .................................................. F02M 25/07
[52] U.S. Cl. ............................................................ 60/605.2
[58] Field of Search ............................................. 60/605.2

[56] References Cited

U.S. PATENT DOCUMENTS

| 4,020,809 | 5/1977 | Kern et al. . | |
|---|---|---|---|
| 4,215,550 | 8/1980 | Dinger et al. | 60/605.2 |
| 4,249,382 | 2/1981 | Evans et al. | 60/605.2 |
| 4,426,848 | 1/1984 | Stachowicz | 60/605.2 |
| 5,778,674 | 7/1998 | Kimura | 60/605.2 |

FOREIGN PATENT DOCUMENTS

| 0 080 327 | 6/1983 | European Pat. Off. . |
| 0 454 943 | 11/1991 | European Pat. Off. . |
| 43 19 380 | 12/1993 | Germany . |
| 43 12 077 | 1/1994 | Germany . |
| 44 16 572 | 4/1995 | Germany . |

OTHER PUBLICATIONS

Patent Abstracts of Japan, vol. 3, No. 24, Feb. 27, 1979.
Patent Abstracts of Japan, vol. 18, No. 660, Dec. 14, 1994.

*Primary Examiner*—Michael Koczo
*Attorney, Agent, or Firm*—Young & Thompson

[57] ABSTRACT

Internal combustion engine with exhaust gas recirculation and turbocharger. The branch (9) connecting the exhaust duct (4) and the inlet duct (5) is situated upstream of the exhaust turbine (6) and downstream of the inlet compressor (7). This branch (9) discharges into the inlet duct via a venturi (10). The regulation of the quantity of exhaust gas is controlled by controlling the exhaust-pressure-regulating devices. These may comprise a turbine with variable geometry.

5 Claims, 3 Drawing Sheets

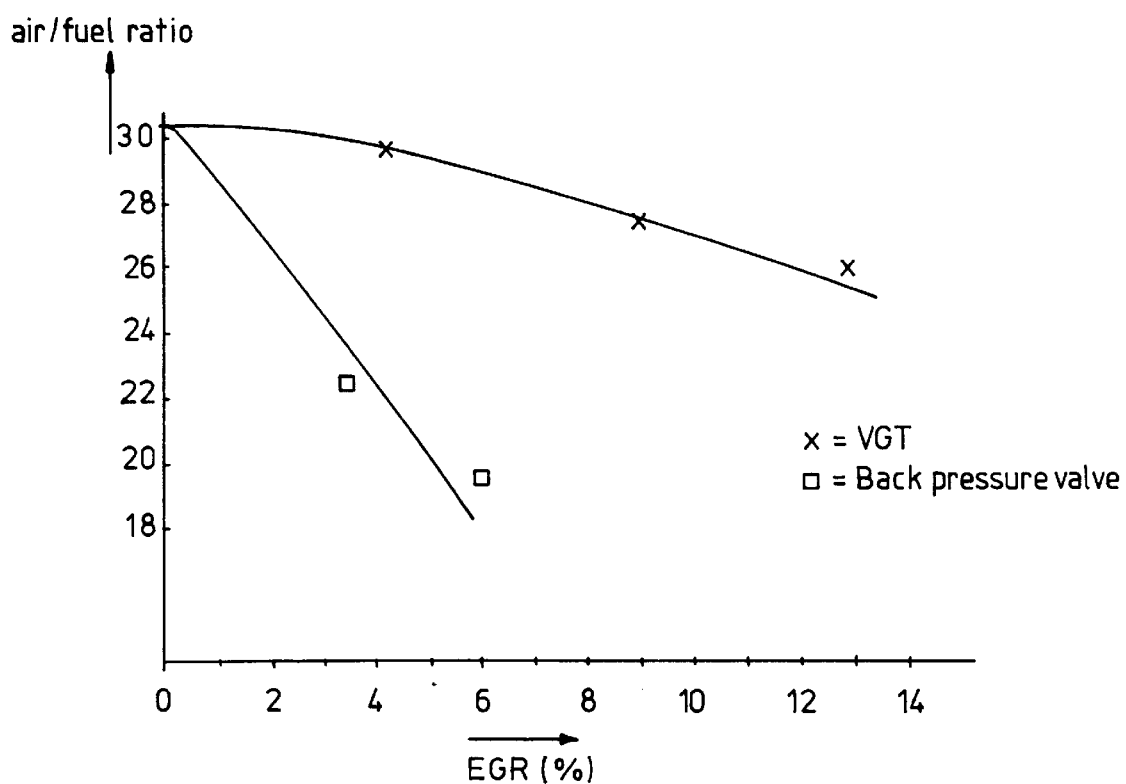

EXHAUST-GAS RECIRCULATION SYSTEM FOR A TURBOCHARGED INTERNAL COMBUSTION ENGINE

The present invention relates to an internal combustion engine according to the preamble of claim 1.

BACKGROUND OF THE INVENTION

Such an internal combustion engine is disclosed in German Offenlegungsschrift 4,319,380 and can be used either for a diesel or an otto engine.

Exhaust-gas recirculation (EGR) is a known technique for reducing, in particular, the $NO_x$ emission of combustion engines. In the case of EGR, some of the exhaust gases are fed back to the inlet of the engine. Especially in the case of turbo-charged engines (engines provided with turbo-compressor) and turbo-charged engines with intermediate cooling (or intercooling; cooling of the compressed inlet air), this can be done in a number of different ways. The most well known are:

a) feedback of exhaust gas from downstream of the turbine to upstream of the compressor,
b) feedback from upstream of the turbine to downstream of the compressor and
c) feedback from upstream of the turbine to upstream of the compressor.

An advantage of design b) is that no contamination can occur of the compressor and the intercooler optionally connected downstream thereof.

A problem in the case of exhaust-gas recirculation is the metering of the quantity of exhaust gas in the inlet duct. This determines the emission of the respective internal combustion engine. In order to limit the $NO_x$ discharge, sufficient exhaust gas has to be recirculated. On the other hand, an unduly large addition has the consequence that the power of the internal combustion engine is adversely affected if this is at the expense of the quantity of air. With an excess EGR flow, the particle emission also increases. In addition, a pump loss is produced by the implementation of an EGR flow by the bleed points, which adversely affects the efficiency.

As a result of the efficiency loss, there are still hardly any EGR systems at present which can effect EGR in the high/maximum load range. To generate EGR in this range, use is fairly often made of a back-pressure valve in the exhaust system. In general, this results in a significant increase in fuel consumption.

EGR systems are in fact frequently used in the lighter diesel engines. As a result of the official exhaust-gas emission test procedures for this category of engines, where the stress is on low and moderate engine load, it is possible to make do with EGR at low and moderate engine load. In this case, 'replacement' EGR is also involved; some of the inlet air is replaced by EGR gas. In the case of low/moderate load, this generally produces no substantial deterioration in the performance because, even after replacement, an adequate excess of air is still present. In these systems, it is generally possible to make do with fitting a simple throttle valve (between compressor and EGR introduction location) in order to effect the required EGR flow.

In the design according to German Offenlegungsschrift 4,319,380, a regulable back-pressure valve is sited downstream of the turbine. As this back-pressure valve is further closed, the back-pressure upstream of the turbine will also increase, as a result of which (more) exhaust gas flows towards the inlet via the bleed. Since turbine work and compressor work do not change or hardly change as a result of this design and in view of the usual compressor characteristic, the (fresh) air flow through the engine will drop. This is 'replacement' EGR. As a result of the consequently lower excess of air, the efficiency of the engine will drop and the smoke emission will increase.

SUMMARY OF THE INVENTION

The object of the present invention is to provide an internal combustion engine which has a high efficiency and in which a complicated regulating system is unnecessary for controlling the quantity of recirculated gas in the inlet duct.

This object is achieved in a combustion engine of the above-mentioned type in that the turbine is designed as a turbine with variable geometry. It is so designed that, when the exhaust back-pressure increases as a result, the work performed by the turbine and compressor increases. The consequence thereof is that the compressor rotary speed and the inlet manifold pressure rise, as a result of which the decrease in the air flow as a consequence of the space occupied by the EGR gas is minimized or eliminated. In this situation, the air excess factor remains at a good level, as a result of which the smoke emission does not increase and the efficiency is affected as little as possible. In this way, it is no longer necessary to fit a throttle valve downstream of the turbine. The efficiency of the combustion engine increases as a result.

It is pointed out that European Patent Application 0 454 943 discloses an exhaust-gas turbine with variable geometry. This turbine is sited between the exhaust of the internal combustion engine and the catalytic convertor. The intention is to control the temperature in the exhaust duct by varying the pressure therein in such a way that a catalytic convertor warms up as quickly as possible after cold start of a combustion engine. In this publication, recirculation of exhaust gas is not suggested, nor is a regulating system for controlling the recirculated exhaust gas/inlet gas ratio. Any suggestion relating to influencing the pumping work of the compressor is also absent. The VGT turbine used according to the invention has a variable geometry, as a result of which the pumping work of the compressor coupled thereto can be influenced. That is to say, with fairly small quantities of exhaust gas, a relatively high resistance can be produced by the turbine, which thus produces a relatively large pumping work and can also produce a relatively low resistance with associated relatively lower work when the quantities of exhaust gas are large.

As a result, it is no longer necessary for work to be lost as a result of throttling in the exhaust duct and the efficiency of the internal combustion engine to be adversely affected.

The feedback of exhaust gas from upstream of the turbine to downstream of the compressor has the important advantages that:

a) compressor and intercooler are not exposed to the EGR gas contamination, and
b) the mass flow through compressor and intercooler does not increase if EGR is used.

A heat exchanger optionally fitted in the inlet duct, such as an intercooler through which EGR also passes, as used in the prior art, will have relatively large dimensions owing to the EGR contamination. In addition, the dimensions will increase further because the mass flow increases as a result of the addition of exhaust gas.

Cooling of the exhaust gas is possible in the case of the internal combustion engine according to the present invention as a result of fitting a separate heat exchanger in the branch line between exhaust duct and inlet duct. As a result of the relatively high pressure of the exhaust gas in the branche line, such a cooler can have a relatively small size, despite the fact that account has to be taken of the contaminating nature of the exhaust gas.

The internal combustion engine according to the invention expediently solves the problem of the use with exhaust-gas recirculation that exists especially in the case of modern pressure-charged heavy-duty engines which have a high efficiency, which is that, in (a substantial part of) the load range, the exhaust manifold pressure is lower than the inlet manifold pressure and consequently exhaust-gas recirculation cannot be effected. Combination of a venturi and the exhaust-pressure-regulating means prevents the efficiency of the engine dropping substantially. In contrast to earlier proposals, in which, for example, a throttle valve is fitted in the inlet system, the air/fuel ratio can after all be kept optimum as a result of the (fresh) air flow being kept unchanged by the compressor.

As a result of fitting a venturi in the inlet duct and positioning the discharge of the branch line on the suction side of this venturi, a disadvantage of the higher pressure, because the gas in the inlet duct is under the higher pressure of the compressor, which the exhaust gas has to overcome in order to be able to enter the inlet duct, is partly removed.

As a result, given a certain VGT turbocharger geometry, a much larger EGR range can be effected. The VGT turbocharger ensures, in particular, that the air/fuel ratio continues to be maintained at a good level (and the pressure balance across the engine remains favourable), as a result of which the increase in fuel consumption is minimum. With this system, an adequate EGR flow can be effected over a substantial part of the load range of the engine without concessions being made in the desired air/fuel ratio and the original power output of the engine. As a result, the device can also be used in 'heavy-duty' engines over the entire operating range.

BRIEF DESCRIPTION OF THE DRAWINGS

The invention will be explained in greater detail below by reference to some exemplary embodiments depicted in the drawing. In the drawing:

FIG. 5 shows graphically the relationship between variation in the quantity of exhaust gas fed back and the air/fuel ratio in the case of a device according to the prior art and a device according to the invention.

DETAILED DESCRIPTION OF THE INVENTION

Figure 1:
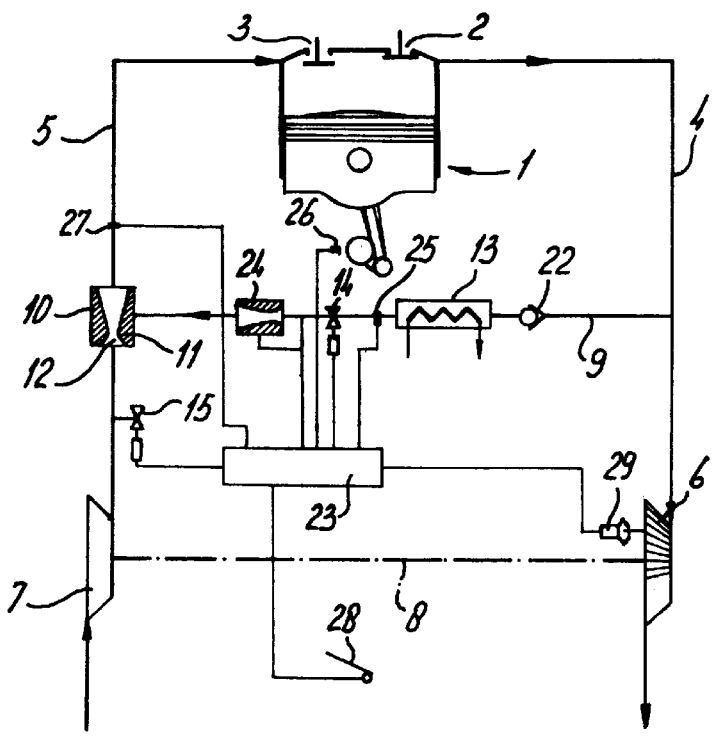
FIG. 1 shows a first embodiment of the internal combustion engine with EGR according to the invention, in which a VGT turbine is used.
Figure 2:
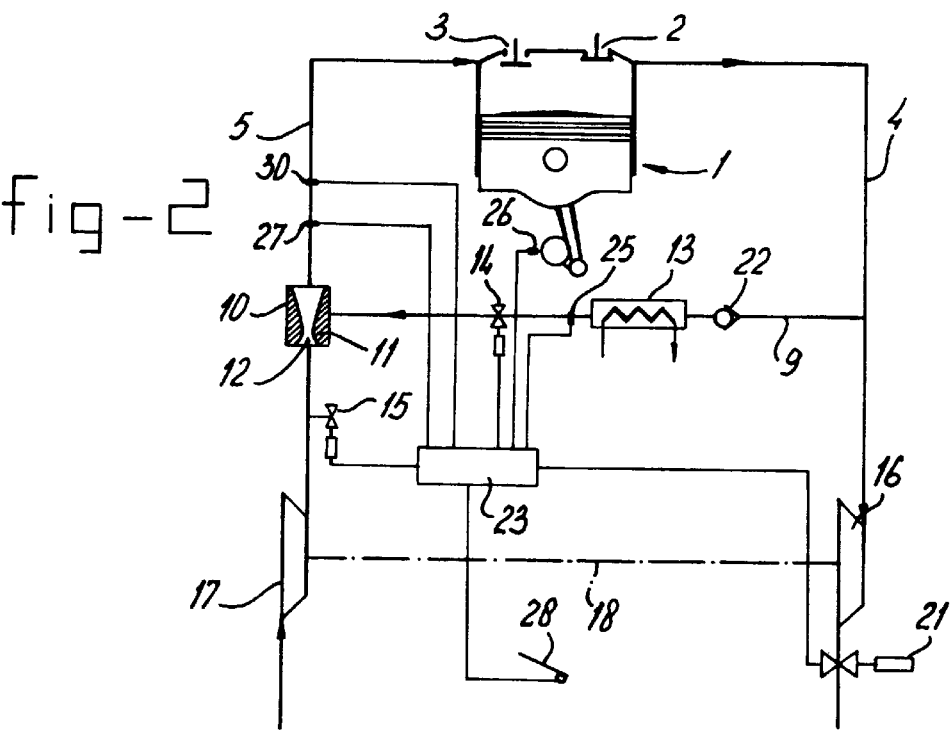
FIG. 2 is a variant of FIG. 1, in which a conventional turbine having back-pressure valve is used.
Figure 3:
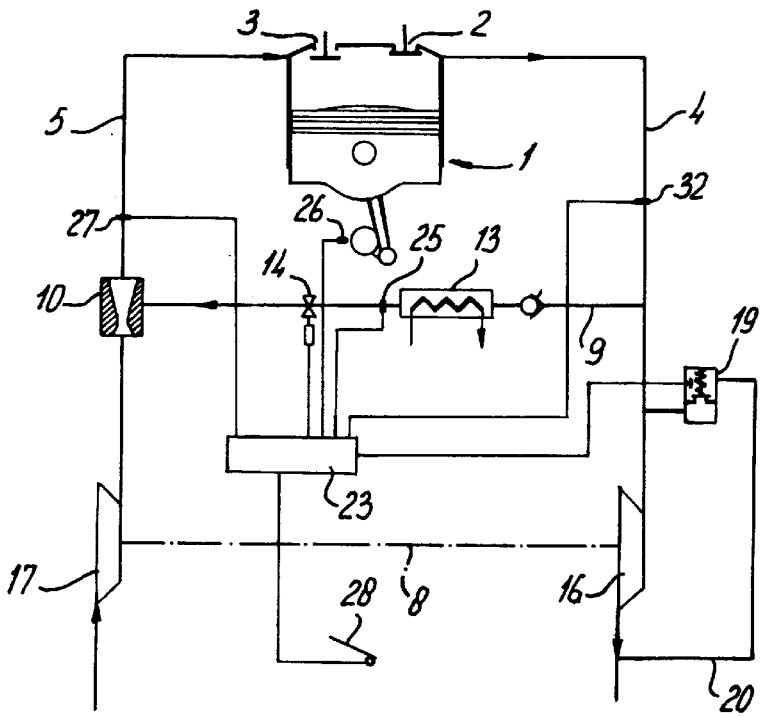
FIG. 3 is an embodiment in which, in addition to a conventional turbine, a so-called 'waste gate' is used.

In FIGS. 1–3, corresponding parts are provided with corresponding reference numerals.

The combustion engine depicted only diagrammatically is indicated in its entirety by 1. It comprises an exhaust 2 and an inlet 3. Connected to the exhaust 2 is an exhaust duct 4 and inlet 3 is connected to inlet duct 5. In the exhaust duct 4 is a so-called 'VGT turbine' 6, i.e. a turbine whose blade angle can be set so that the pump power is not solely dependent on the quantity of gas which is passed through the exhaust duct. This turbine is connected in a conventional manner via a shaft 8 to a compressor 7 in the inlet duct. Exhaust duct 4 and inlet duct 5 are connected upstream of turbine 6 and downstream of turbine 7 respectively by a branch line 9. This branch line 9, which is the sole fluid connection line between the inlet duct 5 and the exhaust duct 4, serves to effect the exhaust-gas recirculation.

Optionally fitted in succession in the embodiment shown here are a non-return valve 22, a heat exchanger 13 and a control valve 14. Branch line 9 discharges into the suction side 11 of a venturi 10, whose main-flow duct is indicated by 12.

A blow-off valve 15 may be present between venturi 10 and compressor 7. Blow-off valve 15 is connected to a control system 23. Connected to this control system 23 is also a sensor for the accelerator position, which sensor is indicated by 28.

Fitted in the EGR line or bleed branch line 9 is a venturi 24 and the pressure in branch 9 is measured both in the throat of said venturi and upstream thereof. The pressure difference determined from these two values can be converted in control system 23 into a mass EGR gas flow. A sensor is indicated by 26 which determines the position of the flywheel of the engine. Control valve 14 is regulated by control system 23. This also applies to actuator 29, which sets the position of the blades in the VGT turbine. A pressure probe is indicated by 27 which records the pressure in the inlet duct 5. This value is passed to control system 23. A temperature sensor is indicated by 25.

In addition, control system 23 regulates the fuel injection and, in addition to the quantity of EGR gas, optionally the temperature thereof. This is possible by operating a ventilator, which is not shown. The signals received from the sensors described above are processed in this control system. The quantity of fuel is determined, as conventionally, on the basis of the accelerator position 28, the rotary speed 26 and the inlet pressure 27.

The primary EGR regulation takes place by adjusting the stator blades with the aid of VGT actuator 29 on the basis of a map showing the desired percentage of recirculated exhaust gas. This percentage can be shown in the map as a function of the rotary speed, the quantity of fuel and the accelerator position. In this case, use is made of a combination of 'open loop' and 'closed loop'. The first adjustment takes place 'open loop' on the basis of the map for the VGT actuator position. The EGR percentage is then monitored 'closed loop' on the basis of the determination of the mass flow through venturi 24 and, if necessary, adjusted. In addition, the VGT map may be readjusted on the basis of a repeated correction (learning regulation).

In addition to the primary EGR regulation with the aid of the stator blades, the positions of the regulating valve 14 and blow-off valve 15 are regulated 'open loop' as a function of the rotary speed, the quantity of fuel and the accelerator position. Depending on the embodiment of the heat exchanger 13, the EGR temperature can also be regulated in the way specified above.

FIG. 2 depicts a system which corresponds to FIG. 1. However, the turbo compressor has an invariable geometry. The turbine thereof is indicated by 16. The connecting shaft is indicated by 18, while the inlet compressor is indicated by 17.

The pressure in the outlet duct 4 is regulated by a back-pressure valve 21. This may be designed as a motor brake valve. In contrast to FIG. 1, in the embodiment shown here, mass flow of the EGR is not determined by means of a venturi, but with the aid of an oxygen (concentration) sensor which is fitted in the inlet duct and is indicated in FIG. 2 by 30.

FIG. 3 depicts a device in which a conventional turbine is used, such as is shown in FIG. 2. Instead of back-pressure valve 21, however, a so-called 'waste gate' 19 is incorporated in a bypass line 20. In this embodiment, the quantity of EGR gas is determined by means of an oxygen sensor fitted in the exhaust duct 4 and this is indicated by 32. A known embodiment of an oxygen sensor is the UEGO sensor manufactured by NTK (Japan). The quantity of EGR is calculated in this case in control system 23 on the basis of the parameters comprising quantity of fuel per engine revolution, inlet-duct pressure and inlet-duct temperature (carbon balance method).

It is also possible to measure the quantity of EGR using an ultrasonic mass-flow sensor.

Figure 4:
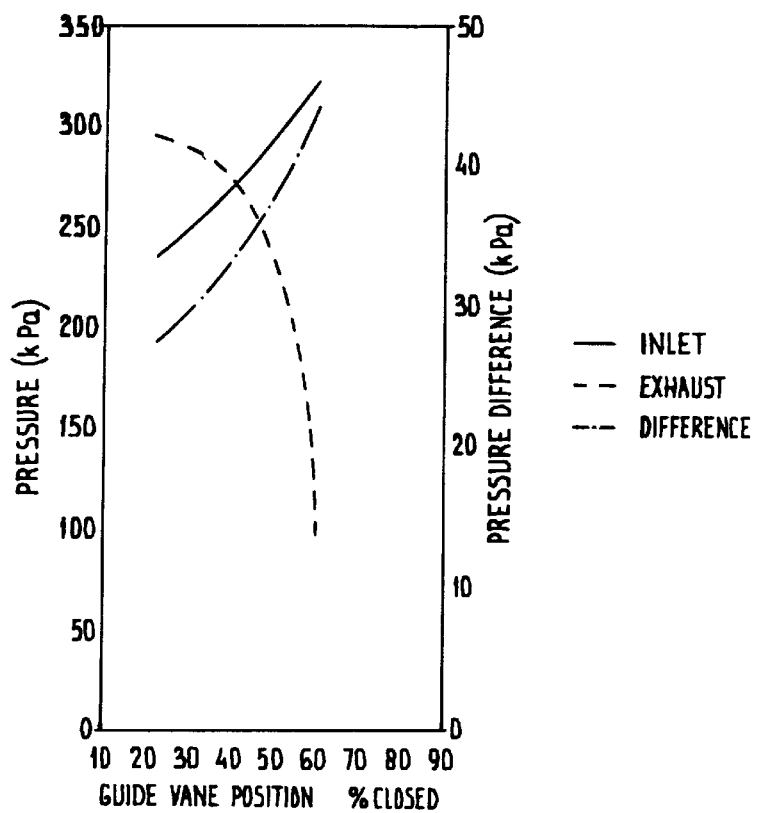
FIG. 4 is a graph which shows the regulation characteristic of a VGT turbine.

FIG. 4 shows graphically the characteristic of a VGT pressure-charging assembly with adjustable stator blades. In this case, line 9 is absent. From this it is evident that, when the blades are adjusted to the closed position, both the pressure in the exhaust duct and the pressure in the inlet duct increase. It is of importance, however, that the pressure in the exhaust duct increases more rapidly than the pressure in the inlet duct. The combination of the sucking action of the venturi mixing device 10 and the drop in the inlet-duct pressure with respect to the exhaust duct pressure is sufficient in the device according to the invention to effect an EGR flow which increases with the closing of the stator blades of turbine 6. The simultaneous increase in the inlet-duct pressure is desirable and necessary in order to maintain the (fresh) air flow through the engine at the desired level. It is possible to speak here of 'additional' EGR. The normal air flow through the engine is maintained and the EGR flow is added thereto. As a result, in contrast to designs according to the prior art, the total mass flow through the engine increases. This mass flow is proportional to the inlet-duct pressure and inversely proportional to the temperature.

As a result of fitting the blow-off valve 15, a further refinement of the regulation of the quantity of fresh air independently of the quantity of recirculated exhaust gas can be provided within the desired bandwidth.

Depending on the combination of engine and VGT pressure-charging assembly and the load point, the following situations may, for example, occur:

When the EGR regulating valve 14 is opened, an EGR flow starts up immediately and the quantity of fresh air through compressor 7 drops. This is undesirable. The original air mass flow can be reached again by now closing valve 14 slightly and adjusting the VGT turbine to a higher output.

When the EGR regulating valve 14 is opened, possibly in combination with the adjustment of the VGT turbine 6 to a higher output, both the EGR flow and the air mass flow increase. If the air mass flow goes above a desired bandwidth under these circumstances, it can be reduced by opening the blow-off valve 15.

The regulation is, for example, effected as follows:

The primary regulation takes place with the aid of the stator blades on the basis of a characteristic diagram comprising the desired EGR percentage (EGR as a function of rotary speed and quantity of fuel). This may or may not take place via a feedback with the aid of an EGR quantity parameter such as the measuring venturi described above or UEGO sensor.

In addition, use is made of a map for the position of regulating valve 14 and blow-off valve 15.

From the above it is evident that, with the EGR system according to the invention, a substantial EGR flow can be effected over a large range of the motor map, including the high and maximum load range. If the VGT pressure-charging assembly or the design according to FIG. 3 is used, this is not accompanied by a substantial increase in the specific fuel consumption or impairment of the particle emission. This embodiment involves 'additional' EGR.

FIG. 5 explains all this in greater detail. Shown on the horizontal axis is the percentage of exhaust gas fed back, while the air/fuel ratio is plotted vertically. In this graph, the use of a back-pressure valve and a VGT is indicated by two lines.

From this it is evident that, if a back-pressure valve is satisfactorily used, a small variation in the quantity of exhaust gas fed back results in an appreciable effect on the air/fuel ratio.

This does not apply, or applies to a much lesser extent, to the VGT turbine used according to the invention.

In the examples described above, the regulating systems for the quantity of fuel and exhaust-gas recirculation are combined in a control system 23. It is clear that they can also be separate from one another. In that case, it is necessary for a signal to be available from the fuel control system to control the EGR. The 'closed loop' regulating system described with reference to FIG. 1 can also be omitted.

The regulating system described above is particularly suitable for heavy engines, which are continuously used at high load for a substantial part of their service life.

From the accompanying examples it appears clear that numerous modifications are possible by combining different components known as such in the prior art, it always being possible to effect optimum metering of exhaust gas into the inlet duct in the manner described above. Such modifications fall within the scope of the present invention as defined in the appended claims.

We claim:

1. Internal combustion engine having an inlet and an exhaust, an inlet duct fluidly connected to the inlet and an outlet duct fluidly connected to the exhaust, and comprising an exhaust pressure regulating means fitted in the exhaust duct and coupled to a compressor fitted in the inlet duct, an exhaust gas recirculation branch line fitted in the exhaust duct between the exhaust of the internal combustion diesel engine and the pressure regulating means, said branch line being connected via a suction line of a venturi to the inlet duct at a point between the compressor and the inlet of the internal combustion diesel engine, said branch line being the sole fluid connection line between the inlet duct and the exhaust duct, the exhaust-pressure regulating means fitted in the exhaust duct downstream of the branch line comprising a turbine with variable geometry, and a control system operatively associated to the internal combustion engine and to the turbine, said control system including means for sensing engine loadings and means for controlling the turbine geometry in response to the sensed engine loadings, whereby at higher engine loadings a change in turbine geometry aimed at increasing the pressure in the exhaust duct before the turbine and in the branch line, also increases the pressure in the inlet duct, and at the same time reduces the pressure difference between the exhaust and inlet ducts, while the compressor produces a relatively larger pumping work, thereby minimizing or eliminating a decrease in air flow through the inlet duct.

2. The internal combustion diesel engine according to claim 1, wherein the branch line comprises a heat exchanger.

3. The internal combustion diesel engine according to claim 1, wherein a control valve is incorporated in the branch line.

4. The internal combustion diesel engine according to claim 1, wherein a blow-off valve is fitted in the inlet duct.

5. The internal combustion diesel engine according to claim 1, wherein a one-way valve is fitted in the branch line such that flow towards the exhaust duct is impeded in the inlet duct.

* * * * *